United States Patent
Koenig et al.

(10) Patent No.: US 7,938,386 B2
(45) Date of Patent: May 10, 2011

(54) FUEL CELL AIR HUMIDIFIER

(75) Inventors: Christian Koenig, Dreieich (DE); Thomas Wollstadt, Bad Camberg (DE); Thomas Hild, Mainz (DE); Rocco Schoene, Nierstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 1098 days.

(21) Appl. No.: 11/683,036

(22) Filed: Mar. 7, 2007

(65) Prior Publication Data

US 2007/0210463 A1 Sep. 13, 2007

Related U.S. Application Data

(60) Provisional application No. 60/781,869, filed on Mar. 13, 2006.

(51) Int. Cl.
*B01F 3/04* (2006.01)
(52) U.S. Cl. ..................................... 261/104
(58) Field of Classification Search ............ 261/99, 261/100, 104, 107
See application file for complete search history.

(56) References Cited

U.S. PATENT DOCUMENTS

| | | | |
|---|---|---|---|
| 5,026,479 A | 6/1991 | Bikson et al. | |
| 5,211,728 A | 5/1993 | Trimmer | |
| 5,236,586 A | 8/1993 | Antoni et al. | |
| 5,434,016 A | 7/1995 | Benz et al. | |
| 5,554,283 A | 9/1996 | Brinda et al. | |
| 5,641,337 A | 6/1997 | Arrowsmith et al. | |
| 5,645,950 A | 7/1997 | Benz et al. | |
| 6,471,195 B2 | 10/2002 | Shimanuki et al. | |
| 6,554,261 B2* | 4/2003 | Katagiri et al. | 261/154 |
| 6,659,433 B2* | 12/2003 | Kusano et al. | 261/102 |
| 6,924,051 B2 | 8/2005 | Meissner et al. | |
| 7,156,375 B2* | 1/2007 | Yazawa | 261/23.1 |
| 2001/0009306 A1* | 7/2001 | Shimanuki et al. | 261/104 |
| 2003/0028073 A1 | 2/2003 | Mochizuki et al. | |
| 2004/0053095 A1 | 3/2004 | Meissner et al. | |
| 2005/0110172 A1* | 5/2005 | Tanaka et al. | 261/104 |
| 2005/0199192 A1 | 9/2005 | Goebel et al. | |
| 2005/0221133 A1 | 10/2005 | Tanihara et al. | |
| 2005/0260469 A1 | 11/2005 | Forte | |
| 2006/0029837 A1 | 2/2006 | Sennoun et al. | |

FOREIGN PATENT DOCUMENTS

| | | |
|---|---|---|
| DE | 691 12 657 T2 | 4/1996 |
| DE | 693 05 742 T2 | 4/1997 |
| DE | 692 16 106 T2 | 6/1997 |
| DE | 692 17 519 T2 | 6/1997 |
| DE | 196 52 695 C1 | 10/1997 |
| DE | 602 02 405 T2 | 12/2005 |
| EP | 0 778 068 B1 | 9/2001 |

\* cited by examiner

*Primary Examiner* — Scott Bushey
(74) *Attorney, Agent, or Firm* — Fraser Clemens Martin & Miller LLC; J. Douglas Miller

(57) ABSTRACT

An air humidifier is disclosed, the air humidifier including a caseless humidification module, wherein sealing properties of the humidification module are optimized.

20 Claims, 2 Drawing Sheets

FUEL CELL AIR HUMIDIFIER

CROSS-REFERENCE TO RELATED APPLICATION

This application claims the benefit of U.S. Provisional Patent Application Ser. No. 60/781,869 filed Mar. 13, 2006.

FIELD OF THE INVENTION

The invention relates to a fuel cell and more particularly to an air humidifier for a fuel cell including a caseless humidification module.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which directly combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electrically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

Many fuel cells use internal membranes, such as the PEM type fuel cell which includes proton exchange membranes, also referred to as polymer electrolyte membranes. In order to perform within a desired efficiency range, it is desirable to maintain the membranes in a moist condition.

Therefore, it is necessary to provide a means for maintaining the fuel cell membranes in the moist condition. This helps avoid damage to or a shortened life of the membranes, as well as to maintain the desired efficiency of operation. Humidification in a fuel cell is discussed in commonly owned U.S. patent application Ser. No. 10/797,671 to Goebel et al.; commonly owned U.S. patent application Ser. No. 10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. patent application Ser. No. 10/516,483 to Tanihara et al., hereby incorporated herein by reference in its entirety, and U.S. Pat. No. 6,471,195, hereby incorporated herein by reference in its entirety. A common structure used to seal the air humidification module with the housing of the air humidifier is a pair of spaced apart radial O-ring gaskets. The O-ring gaskets seal air streams within the housing from one another and minimize air leakage therebetween.

The O-ring gaskets have several advantages such as universal availability, usability, and serviceability. However, certain shortcomings also exist. Seating surfaces for the o-ring gaskets demand high precision in the geometry of the involved surfaces. Additionally, the gasket area becomes rather voluminous to militate against movement of the o-ring gaskets which results in leakage. Finally, the air humidification module requires an additional housing or an internal support to enhance the stiffness thereof during the assembly process of the air humidifier.

In order to achieve the demanded precision, complex manufacturing is necessary which results in a higher cost. The additional housing of the air humidification module is at present necessary for enhancing the stiffness, but the housing increases the complexity, cost, weight, and the required package space. For production of prototypes, the use of radial O-ring gaskets is acceptable since the cost and component space requirements are not as limiting as required for mass production. However, use of the O-ring gaskets in mass production is not practical.

It would be desirable to produce a humidifier including a caseless humidification module, wherein sealing properties of the humidification module are optimized.

SUMMARY OF THE INVENTION

Consistent and consonant with the present invention, a humidifier including a caseless humidification module, wherein sealing properties of the humidification module are optimized, has surprisingly been discovered.

In one embodiment, the humidifier comprises a hollow housing including a first channel and a second channel formed in an inner surface thereof; a humidification module having a first end and a second end, the first end having a first radially outwardly extending collar and the second end having a second radially outwardly extending collar, the first collar and the second collar respectively disposed in and substantially sealed in the first channel and the second channel of the housing to form a first chamber and a second chamber in the housing, wherein the first chamber is adapted to receive a first fluid and the second chamber is adapted to receive a second fluid; and a vapor permeable membrane disposed in the module and adapted to facilitate a vapor transfer between the first fluid and the second fluid.

In another embodiment, the humidifier comprises a hollow housing including a first channel and a second channel formed in an inner surface thereof, the housing having a first inlet aperture, a second inlet aperture, a first outlet aperture, and a second outlet aperture formed therein; a humidification module having a first end and a second end, the first end having a first radially outwardly extending collar and the second end having a second radially outwardly extending collar, each of the collars having a central aperture formed therein, the module including a water permeable membrane formed by a plurality of hollow fibers and disposed between the first collar and the second collar, wherein the first collar and the second collar are respectively disposed in the first channel and the second channel of the housing; and a sealing material disposed between each of the first collar and the first channel and the second collar and the second channel to form a substantially fluid-tight seal, the housing cooperating with the sealing material and the collars of the module to form a first chamber and a second chamber, the first chamber providing a first fluid conduit from the first inlet aperture around an exterior of the fibers of the membrane to the first outlet aperture, and the second chamber providing a second fluid conduit from the second inlet aperture through the central apertures formed in the collars and an interior of the fibers of the membrane to the second outlet aperture.

In yet another embodiment, the humidifier comprises a hollow housing including a first channel and a second channel formed in an inner surface thereof, the housing having a first inlet aperture, a second inlet aperture, a first outlet aperture, and a second outlet aperture formed therein; a humidification module having a first end and a second end, the first end having a first radially outwardly extending collar and the second end having a second radially outwardly extending collar, each of the collars having a central aperture formed therein, the first collar and the second collar respectively disposed in and substantially sealed in the first channel and the second channel of the housing to form a first chamber and a second chamber in the housing, the first chamber providing a first fluid conduit from the first inlet aperture to the first outlet aperture and the second chamber providing a second fluid conduit from the second inlet aperture through the central apertures formed in the collars to the second outlet aperture; and a water vapor permeable membrane disposed in the module and adapted to facilitate a water vapor transfer between the first fluid conduit and the second fluid conduit.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
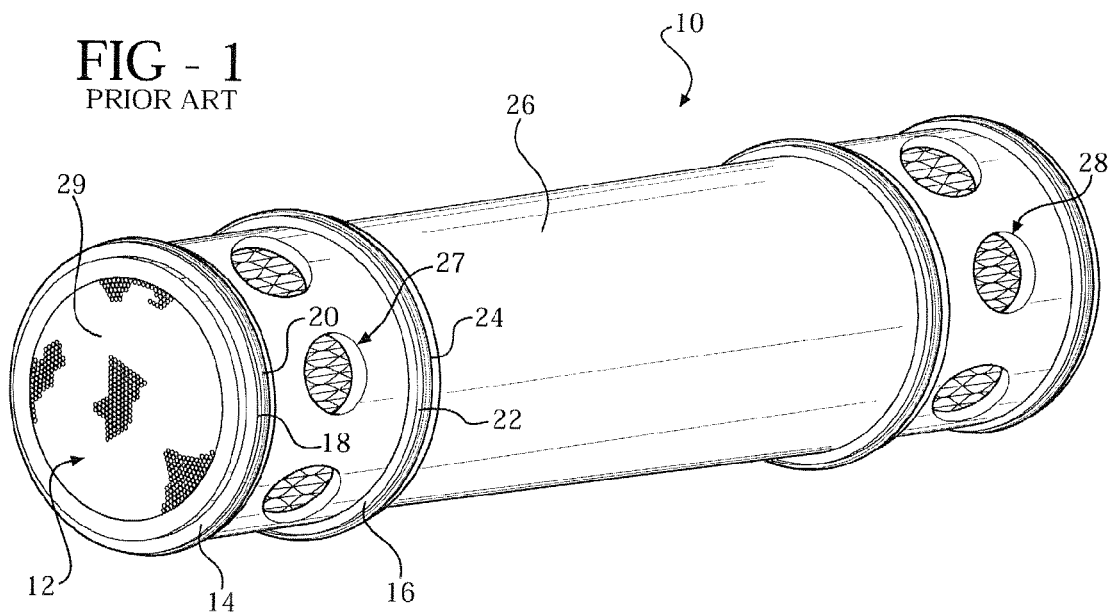
FIG. 1 is a perspective view of an air humidification module for a humidifier for a fuel cell according to the prior art.

FIG. 1 shows an air humidification module 10 according to the prior art. The module 10 is generally cylindrical with a circular cross-section. Other cross-sectional shapes are also used such as rectangular. The module 10 includes a longitudinal aperture 12 formed therein. A housing (not shown) surrounds the module 10. The housing includes a first inlet (not shown) and a first outlet (not shown) formed therein to facilitate a flow of a first fluid therethrough and communicate with the aperture 12. A second inlet (not shown) and a second outlet (not shown) are also formed in the housing to facilitate a flow of a second fluid therethrough and respectively communicate with an inlet 27 and an outlet 28 of the module 10. Typically, the first fluid and the second fluid are oxygen or air having different water vapor partial pressures or humidity levels, although other fluids can be used.

Each end of the module 10 includes a first annular ring 14 and a spaced apart second annular ring 16. The first annular ring 14 is disposed adjacent the end of the module 10. A groove 18 is formed in an outer surface of the first annular ring 14. A first O-ring 20 is disposed in the groove 18.

The second annular ring 16 is spaced from the first annular ring 14 in a direction away from the end of the module 10. A groove 22 is formed in an outer surface of the second annular ring 16 which receives a second O-ring 24 therein.

An outer wall 26 of the module 10 surrounds a membrane 29 such as a hollow fiber membrane. The membrane 29 is a water vapor permeable membrane. It is desirable that a permeation rate of water vapor through the membrane 29 is higher than a permeation rate of the first fluid and the second fluid through the membrane 29. A ratio of the water vapor permeation rate to the fluid permeation rate of 10:1 or more has been found to provide satisfactory results, although other ratios can be used.

In operation, the first fluid flows into the housing through the first inlet, through the aperture 12 and an inner portion of the hollow tubes forming the membrane 29, and exits the housing through the first outlet. The second fluid flows into the inlet 27, between the hollow tubes forming the membrane 29 to communicate with an outer portion of the hollow tubes forming the membrane 29 and out through the second outlet. Water vapor in the fluid having the higher water vapor partial pressure permeates through the membrane 29 and into the fluid having the lower water vapor partial pressure. Thus, the humidity level in the fluid having the higher water vapor partial pressure is decreased and the humidity level in the fluid having the lower water vapor partial pressure increased. The first O-ring 20 and the second O-ring 24 militate against a mixing of the first fluid and the second fluid by sealingly engaging an inner surface of the housing.

Figure 2:
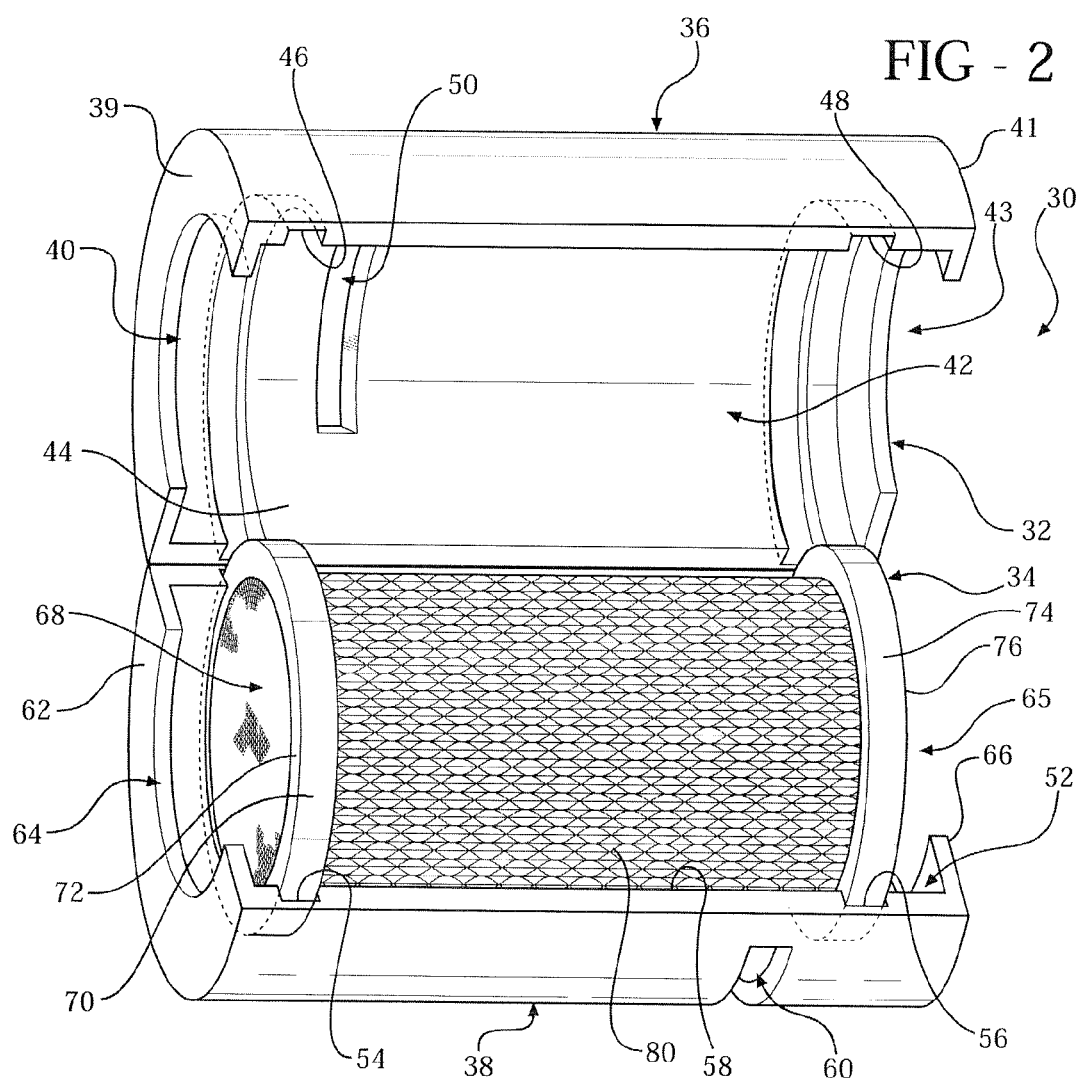
FIG. 2 is a perspective view of a humidifier for a fuel cell according to an embodiment of the invention and showing a housing of the humidifier in an open condition to facilitate a viewing of an air humidification module disposed in the housing.

FIG. 2 illustrates a humidifier 30 for an air stream of a fuel cell (not shown) according to an embodiment of the invention. It is understood that the humidifier 30 can be used in other applications as desired without departing from the scope and spirit of the invention. The humidifier 30 includes a housing 32 and an air humidification module 34 disposed in the housing 32. The housing 32 has a generally cylindrical shape with a substantially circular cross-section. It is understood that other cross-sectional shapes can be used as desired. The housing 32 includes a first housing section 36 and a second housing section 38. It is understood that the first section 36 and the second section 38 can be separately formed or formed having a common portion such as a living hinge, for example. The housing 32 is shown in FIG. 2 in an open position.

The first section 36 forms a hollow interior 42. The interior 42 of the first section 36 is adapted to receive a portion of the air humidification module 34 therein. An inner surface 44 of the first section 36 includes a first groove or channel 46 and a second groove or channel 48 formed therein. A first inlet aperture 50 is formed in the first section 36 and is adapted to provide fluid communication between a source of a first fluid and the hollow interior 42 of the first section 36. Typically, the first fluid is oxygen or air, although other fluids can be used.

A first end 39 of the first section 36 has a second inlet aperture 40 formed therein and a second end 41 of the first section 36 has a second outlet aperture 43 formed therein. The second inlet aperture 40 is adapted to provide fluid communication with a source of second fluid and the interior 42 of the first section 36. The second outlet aperture 43 is adapted to discharge the second fluid from the hollow interior 42 of the first section 36. Typically, the second fluid is oxygen or air, although other fluids can be used. Additionally, the first fluid and the second fluid may have different water vapor partial pressures or humidity levels.

The second section 38 has a hollow interior 52 formed therein. The interior 52 of the second section 38 is adapted to receive a portion of the air humidification module 34. The interior 42 of the first section 36 and the interior 52 of the second section 38 cooperate to form a hollow chamber within the housing 32 which receives the air humidification module 34 therein.

Figure 3:
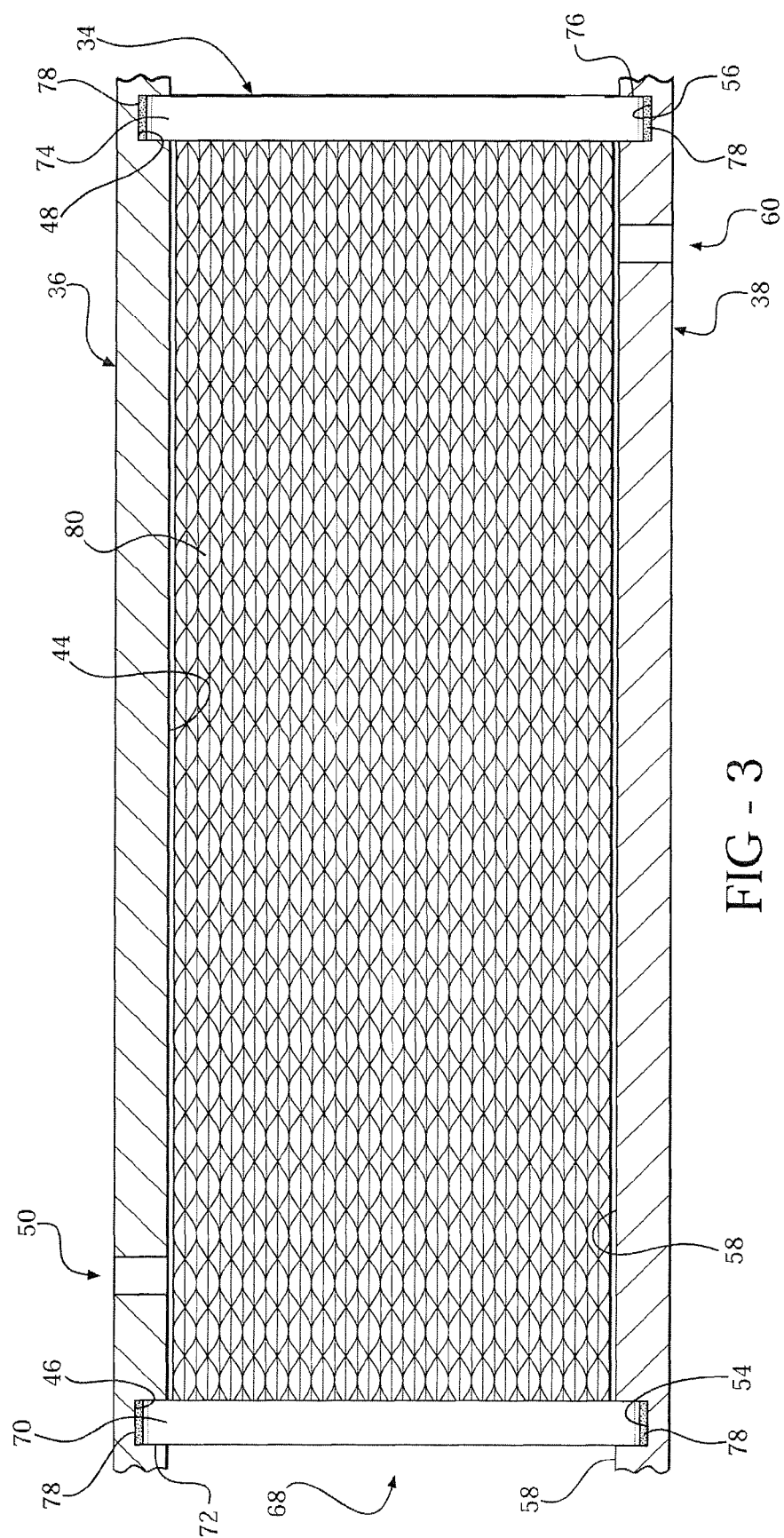
FIG. 3 is a fragmentary perspective view of the air humidification module of FIG. 2 and showing a portion of the housing in section.

A first groove or channel 54 and a second groove or channel 56 are formed in an inner surface 58 of the second section 38, as more clearly shown in FIG. 3. The first channel 54 and the second channel 56 of the second section 38 are respectively aligned with the first channel 46 and the second channel 48 of the first section 36 to form a first annular groove or channel and a second annular groove or channel in the housing 32. An outlet aperture 60 is formed in the second section 38 and is adapted to discharge the first fluid from the hollow interior 52 of the second section 38.

A first end 62 of the second section 38 has a second inlet aperture 64 formed therein and a second end 66 of the second section 38 has a second outlet aperture 65 formed therein. The second inlet aperture 64 is adapted to provide fluid communication with the source of second fluid and the interior 52 of the second section 38. The second outlet aperture 65 is adapted to discharge the second fluid from the hollow interior 52 of the second section 38. When the first section 36 and the second section 38 are assembled to form the housing 32, the second inlet aperture 40 and the second inlet aperture 64 cooperate to form a second inlet aperture of the housing 32 and the second outlet aperture 43 and the second outlet aperture 65 cooperate to form a second outlet aperture of the housing 32.

The module 34 has a generally cylindrical shape with a substantially circular cross-section. It is understood that other cross-sectional shapes can be used as desired. A radially outwardly extending annular collar 70 is formed at a first end 72 of the module 34 and a radially outwardly extending annular collar 74 is formed at a second end 76 of the module 34. An aperture 68 is formed in each of the collars 70, 74. The collars 70, 74 are adapted to be respectively disposed in the first channel 54 and the second channel 56.

A sealing material 78 is disposed between the collars 70, 74 and walls forming the channels 54, 56 to create a substantially air-tight seal therebetween. Although the sealing material 78 can be any conventional sealing material, a viscous liquid sealing material such as glue, for example, has been found to provide satisfactory results. It is also understood that gaskets such as deformable gaskets can be used. Other conventional sealing materials that may be used such include a UV-curable elastic glue, a polyurethane, a silicon rubber, a thermoplastic elastomer, and a hot-melt adhesive, for example.

A water permeable membrane 80 of the module 34 is disposed between the collars 70, 74. It is desirable that a permeation rate of water vapor through the membrane is higher than a permeation rate of the first fluid and the second fluid through the membrane. A ratio of the water vapor permeation rate to the fluid permeation rate 10:1 or more has been found to provide satisfactory results. However, it is understood that other ratios can be used without departing from the scope and spirit of the invention.

The membrane 80 typically includes a large number (generally in the range of tens of thousands to hundreds of thousands) of hollow fiber membranes bundled nearly in parallel to form a hollow fiber membrane bundle, although more or fewer hollow fiber membranes can be used. Additionally, other membrane types can be used as desired. The ends of the hollow fiber membranes are maintained in an opened state. The hollow fiber membranes can be bundled in a so-called twilled state by alternately cross-arranging the hollow fiber membranes with respect to an axial direction of the hollow fiber membrane bundle The membrane 80 can be any conventional water permeable membrane and can be either a porous membrane or a non-porous membrane. A non-porous membrane is typically more desirable since the porous membrane permits components other than water vapor to pass therethrough. Additionally, the membrane 80 preferably has material properties (heat resistance, chemical resistance, durability and hydrolysis resistance) suitable for use with water vapor or oxygen gas at a high temperature of about 80 degrees Celsius. The porous membrane can be produced from any conventional porous material such as perfluorocarbon resin having a sulfonic acid group, polyethylene resin, polypropylene resin, polyvinylidene fluoride resin, polyethylene tetrafluoride resin, polysulfone resin, polyethersulfone resin, polyamide resin, polyamidoimide resin, polyetherimide resin, polycarbonate resin, and cellulose derivative resin, for example. The non-porous membrane can be produced from any conventional non-porous material such as polyimide resin, polysulfone resin, perfluorocarbon resin having a sulfonic acid group, polyethersulfone resin, polyamide resin, polyamidoimide resin, polyetherimide resin, polycarbonate resin, polyphenylene oxide resin, polyacetylene resin, and cellulose derivative resin, for example.

The humidifier 30 is assembled by applying the sealing material 78 to at least one of the surfaces forming the channels 46, 48, 54, 56 and the collars 70, 74. Where a viscous liquid sealing material 78 is used, the application is typically done shortly prior to insertion of the collars 70, 74 into the channels 54, 56. The viscous liquid sealing material 78 also adheres the collars 70, 74 to the surfaces forming the channels 46, 48, 54, 56. Any spaces or voids between the collars 70, 74 and the surfaces forming the channels 46, 48, 54, 56 are occupied by the sealing material 78.

The first section 36 is then placed on the second section 38 to insert the collars 70, 74 into the channels 46, 48. The first section 36 and the second section 38 are then joined to form the housing 32. Any conventional joining method can be used to join the first section 36 and the second section 38 such as gluing or welding, for example. When assembled, the housing 32 cooperates with the sealing material 78 and the collars 70, 74 to form two separate chambers within the housing 32. The first chamber provides a first fluid conduit from the first inlet aperture 50 formed in the first section 36, around an exterior of the fibers of the membrane 80, to the first outlet aperture 60 formed in the second section 38. The second chamber provides a second fluid conduit from the second inlet aperture of the housing 32, through the apertures 68 formed in the collars 70, 74 and an interior portion of fibers forming the membrane 80 of the module 34, to the second outlet aperture of the housing 32.

After application of the sealing material 78 and insertion of the collars 70, 74 into the channels 46, 48, 54, 56, the sealing material 78 is permitted to solidify or polymerize, if necessary. The sealing material 78 may be light induced or chemically induced to polymerize. Additionally, the sealing material 78 may be cured or simply permitted to cool down to seal the interface between the collars 70, 74 and the surfaces forming the channels 54, 56.

Due to the use of the sealing material 78, the channels 54, 56 need not be precisely formed, since the sealing material 78 occupies any spaces or voids formed between the collars 70, 74 and the surfaces forming the channels 54, 56. Satisfactory results have been obtained using the sealing material 78 with channels 54, 56 having a depth of approximately 0.1 to 5 mm. It is understood that channels having different depths can be used.

In operation, the first fluid flows through the first inlet aperture 50, around an exterior of the fibers of the membrane 80 to communicate with the outer portion of the fibers, and out of the first outlet aperture 60. The second fluid flows into the housing 32 through the second inlet aperture of the housing, through the apertures 68 formed in the collars 70, 74 and the interior portion of the fibers forming the membrane 80 of the module 34, and exits the housing 32 through the second outlet aperture of the housing. Water vapor in the fluid having the higher water vapor partial pressure permeates through the membrane 80 into the fluid having the lower water vapor partial pressure. Thus, the humidity level in the fluid having the higher water vapor partial pressure is decreased and the humidity level in the fluid having the lower water vapor partial pressure increased. Typically, the first fluid is the fluid having the higher water vapor partial pressure and the second fluid is the fluid having the lower water vapor partial pressure. The substantially air-tight seal created by the sealing material 78 helps the sealing material 78 to militate against a mixing of the first fluid and the second fluid.

The humidifier 30 having the housing 32 produced from two sections 36, 38 minimizes a complexity of manufacturing. Due to the minimized complexity of manufacturing, the cost thereof is minimized. A reliability of the seal created by the sealing material 78 is also maximized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A humidifier comprising;
    a hollow housing including a first groove and a second groove formed in an inner surface thereof;
    a humidification module having a first end and a second end, the first end having a first radially outwardly extending collar and the second end having a second radially outwardly extending collar, the first collar and the second collar respectively disposed in and substantially sealed in the first groove and the second groove of said housing to form a first chamber and a second chamber in said housing, wherein the first chamber is adapted to receive a first fluid and the second chamber is adapted to receive a second fluid; and
    a vapor permeable membrane disposed in said module and adapted to facilitate a vapor transfer between the first fluid and the second fluid.

2. The humidifier according to claim 1, including a sealing material disposed between each of the first collar and the second collar and said housing to form a substantially fluid-tight seal.

3. The humidifier according to claim 2, wherein the sealing material is at least one of a glue, a UV-curable elastic glue, a polyurethane, a silicon rubber, a thermoplastic elastomer, and a hot-melt adhesive.

4. The humidifier according to claim 1, wherein a permeation rate of vapor through said membrane is higher than a permeation rate of at least one of the first fluid and the second fluid through said membrane.

5. The humidifier according to claim 4, wherein a ratio of the permeation rate of vapor to the permeation rate of at least one of the first fluid and the second fluid is at least 10 to 1.

6. The humidifier according to claim 1, wherein said membrane is formed by a plurality of hollow fibers.

7. The humidifier according to claim 1, wherein said membrane is one of a porous membrane and a non-porous membrane.

8. A humidifier comprising:
    a hollow housing including a first groove and a second groove formed in an inner surface thereof, said housing having a first inlet aperture, a second inlet aperture, a first outlet aperture, and a second outlet aperture formed therein;
    a humidification module having a first end and a second end, the first end having a first radially outwardly extending collar and the second end having a second radially outwardly extending collar, each of the collars having a central aperture formed therein, said module including a water vapor permeable membrane formed by a plurality of hollow fibers and disposed between the first collar and the second collar, wherein the first collar and the second collar are respectively disposed in the first groove and the second groove of said housing; and a sealing material disposed between each of the first collar and the first groove and the second collar and the second groove to form a substantially fluid-tight seal, said housing cooperating with said sealing material and the collars of said module to form a first chamber and a second chamber, the first chamber providing a first fluid conduit from the first inlet aperture around an exterior of the fibers of the membrane to the first outlet aperture, and the second chamber providing a second fluid conduit from the second inlet aperture through the central apertures formed in the collars and an interior of the fibers of the membrane to the second outlet aperture.

9. The humidifier according to claim 8, wherein said sealing material is at least one of a glue, a UV-curable elastic glue, a polyurethane, a silicon rubber, a thermoplastic elastomer, and a hot-melt adhesive.

10. The humidifier according to claim 8, wherein the first fluid conduit is adapted to receive a first fluid therein and the second fluid conduit is adapted to receive a second fluid therein.

11. The humidifier according to claim 10, wherein a permeation rate of water vapor through the membrane is higher than a permeation rate of at least one of the first fluid and the second fluid through the membrane.

12. The humidifier according to claim 11, wherein a ratio of the permeation rate of water vapor to the permeation rate of at least one of the first fluid and the second fluid is at least 10 to 1.

13. The humidifier according to claim 8, wherein the membrane is one of a porous membrane and a non-porous membrane.

14. The humidifier according to claim 8, wherein a depth of the first groove is between about 0.1 millimeters and about 5 millimeters, and a depth of the second groove is between about 0.1 millimeters and about 5 millimeters.

15. A humidifier comprising:
a hollow housing including a first groove and a second groove formed in an inner surface thereof, said housing having a first inlet aperture, a second inlet aperture, a first outlet aperture, and a second outlet aperture formed therein;

a humidification module having a first end and a second end, the first end having a first radially outwardly extending collar and the second end having a second radially outwardly extending collar, each of the collars having a central aperture formed therein, the first collar and the second collar respectively disposed in and substantially sealed in the first groove and the second groove of said housing to form a first chamber and a second chamber in said housing, wherein the collars are circumscribed by the grooves to militate against axial movement of said module within said housing, the first chamber providing a first fluid conduit from the first inlet aperture to the first outlet aperture and the second chamber providing a second fluid conduit from the second inlet aperture through the central apertures formed in the collars to the second outlet aperture; and a water vapor permeable membrane disposed in said module and adapted to facilitate a water vapor transfer between the first fluid conduit and the second fluid conduit.

16. The humidifier according to claim 15, including a sealing material disposed between each of the first collar and the second collar and said housing to form a substantially fluid-tight seal.

17. The humidifier according to claim 15, wherein said membrane is formed by a plurality of hollow fibers.

18. The humidifier according to claim 8, wherein at least one of the first inlet aperture and the first outlet aperture is an elongate slot.

19. The humidifier according to claim 15, wherein said housing includes a first section pivotally coupled to a second section.

20. The humidifier according to claim 15, wherein said housing includes a first section longitudinally coupled to a second section.

* * * * *